(12) United States Patent
Crooks

(10) Patent No.: US 7,556,143 B2
(45) Date of Patent: Jul. 7, 2009

(54) SPROCKET CONSTRUCTION FOR CONVEYOR ROLLERS

(76) Inventor: Wayne Crooks, 1649 Heather Rd., Madison, OH (US) 44057

( * ) Notice: Subject to any disclaimer, the term of this patent is extended or adjusted under 35 U.S.C. 154(b) by 141 days.

(21) Appl. No.: 11/752,388

(22) Filed: May 23, 2007

(65) Prior Publication Data

US 2008/0289934 A1     Nov. 27, 2008

(51) Int. Cl.
    *B65G 17/24*     (2006.01)
(52) U.S. Cl. ....................... 198/779; 198/834
(58) Field of Classification Search ........... 198/779, 198/834, 835, 850, 853; 474/95, 156, 157, 474/166, 202; 74/507, 510
    See application file for complete search history.

(56) References Cited

U.S. PATENT DOCUMENTS

| | | | | |
|---|---|---|---|---|
| 3,724,285 A | * | 4/1973 | Lapeyre | 198/834 |
| 4,257,519 A | * | 3/1981 | Leach | 198/834 |
| 5,518,109 A | * | 5/1996 | Dailey et al. | 198/834 |
| 5,791,455 A | * | 8/1998 | Clopton | 198/779 |
| 5,819,910 A | * | 10/1998 | Langer et al. | 198/834 |
| 6,758,776 B2 | * | 7/2004 | Fye et al. | 198/834 |
| 6,766,899 B1 | * | 7/2004 | Guldenfels | 198/834 |

* cited by examiner

*Primary Examiner*—James R Bidwell
(74) *Attorney, Agent, or Firm*—Pearne & Gordon LLP

(57) ABSTRACT

A sprocket assembly for a roller conveyor comprising a hub and a sprocket plate, the hub having a central cylindrical bore for fitting onto a round shaft of a roller, the hub having provisions for rotationally and axially locking it on a shaft in a manner adequate to transmit torque to the shaft and rotationally drive the roller, the sprocket plate having peripheral teeth adapted to be interengaged with a drive chain and a central bore capable of receiving the shaft, the sprocket plate and hub being constructed and arranged to be removably joined together with the centers of their respective bores coincident, said hub and sprocket plate having complementarily shaped radially extending abutting surfaces enabling the sprocket plate to develop torque on the hub by compressive forces developed by the radially extending sprocket plate surfaces against the radially extending hub surfaces.

15 Claims, 5 Drawing Sheets

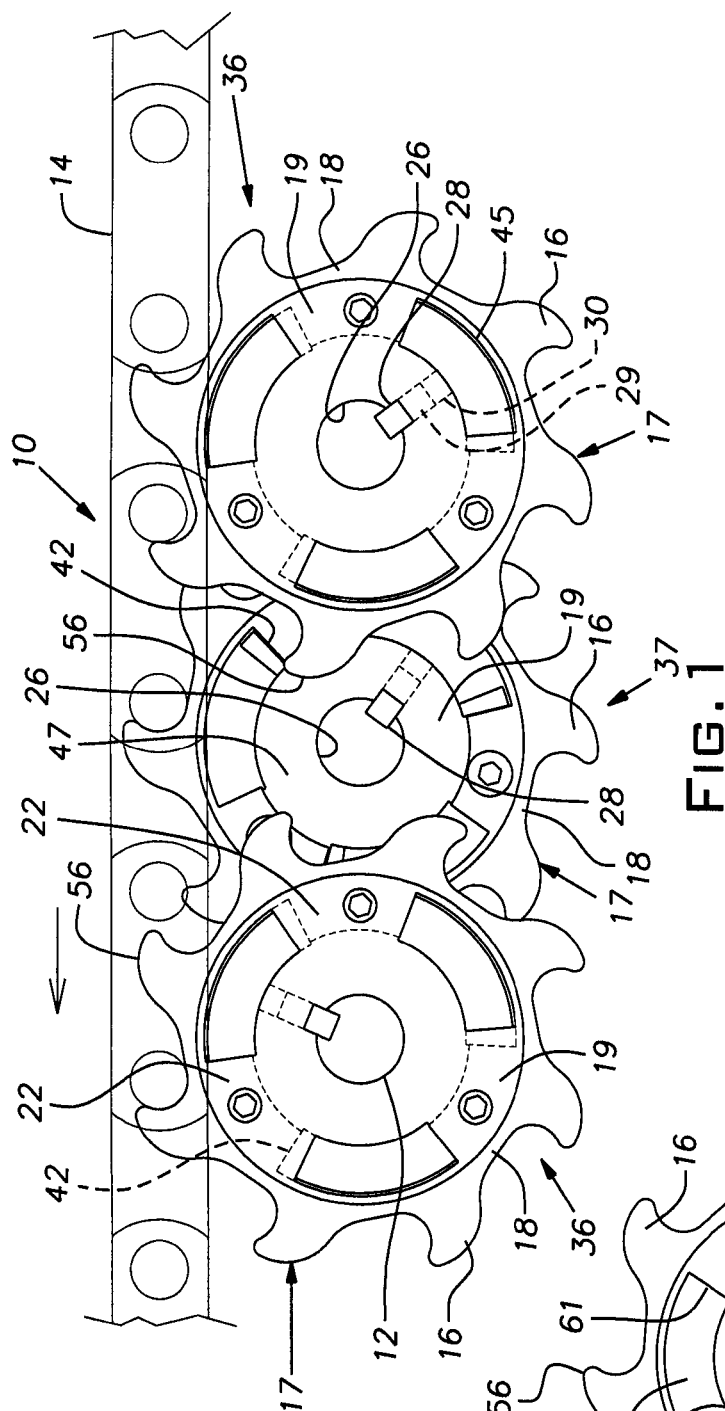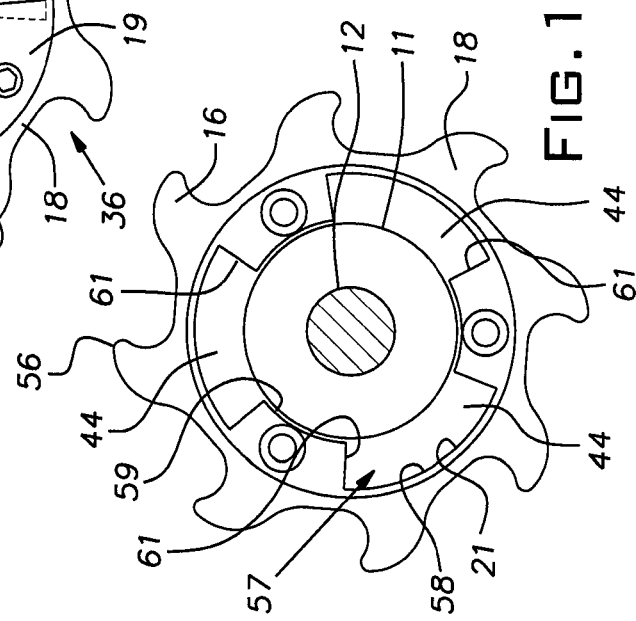

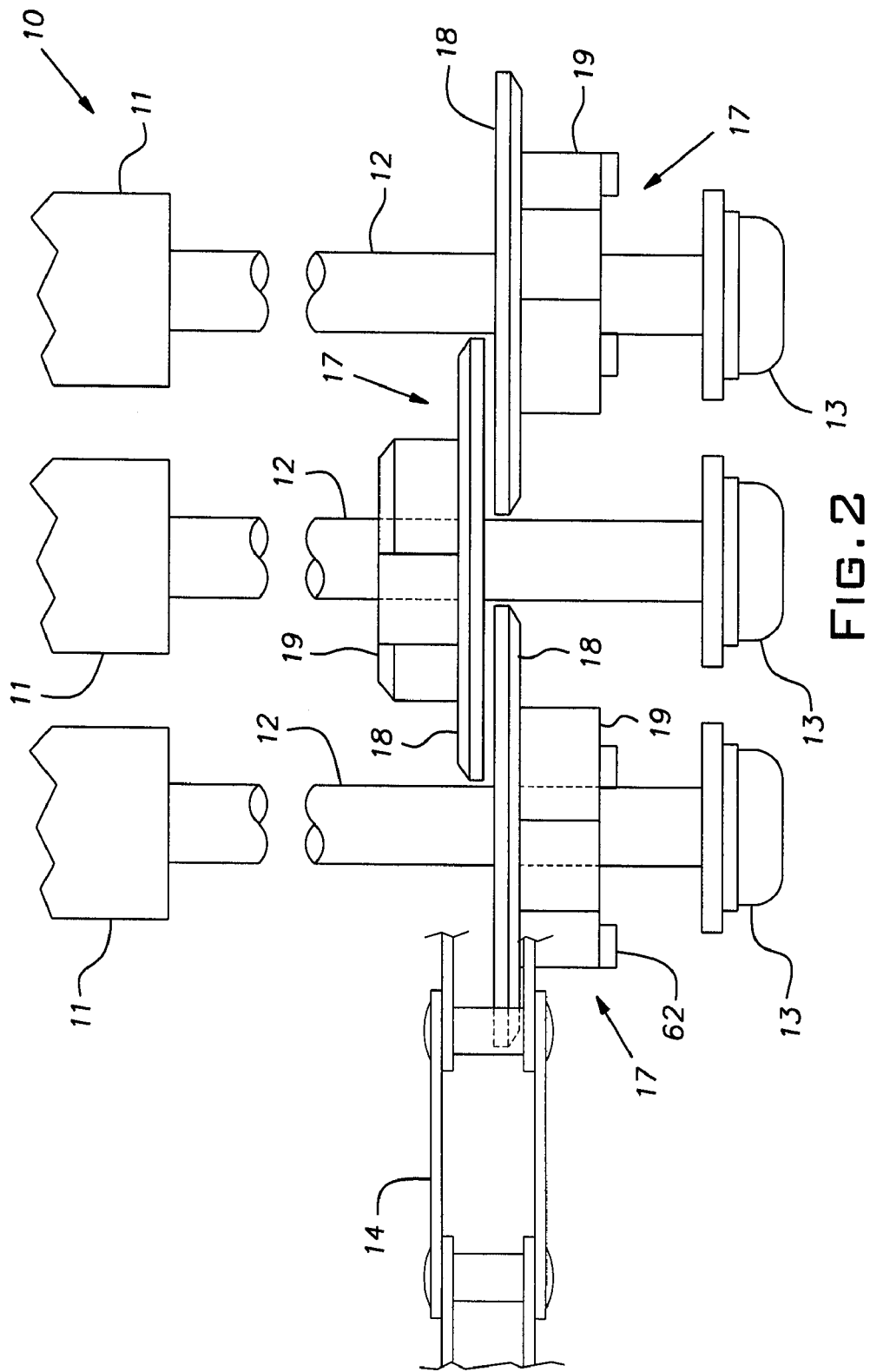

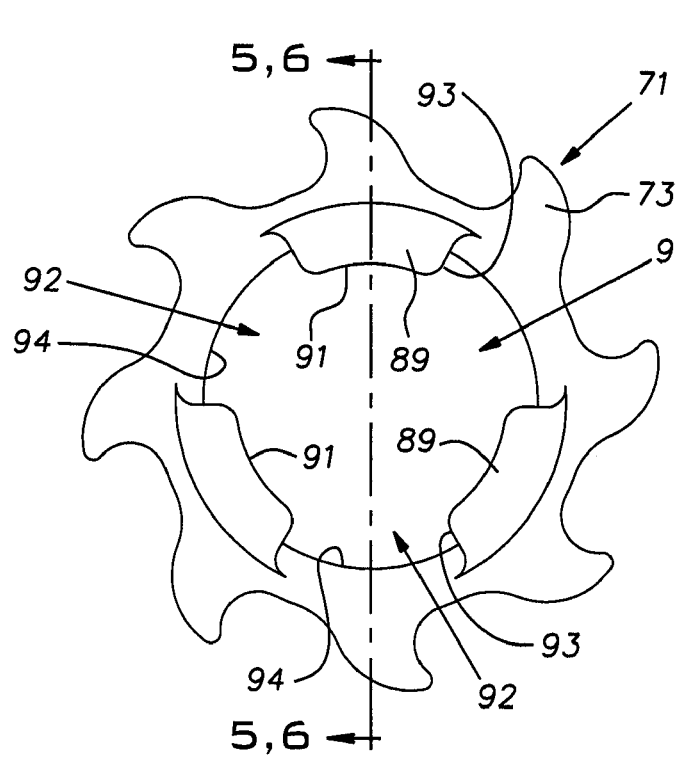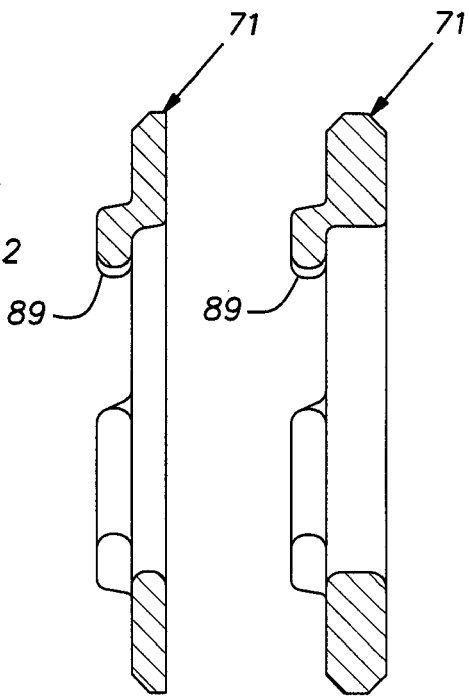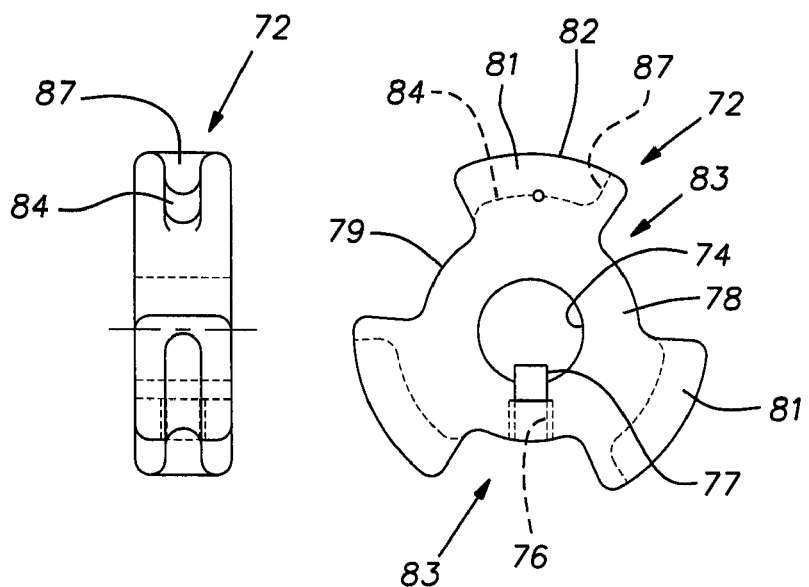

SPROCKET CONSTRUCTION FOR CONVEYOR ROLLERS

BACKGROUND OF THE INVENTION

The invention relates to improvements in powered roller conveyors and, in particular, to a novel drive sprocket arrangement for the rollers of such conveyors.

PRIOR ART

Power driven roller conveyors are used in process equipment for conveying materials such as wet slurrys, mats, and so forth, through dewatering and/or drying stations. By way of example, wet or water laden materials conveyed by such conveyors are processed into wall board, ceiling tile, and the like as is known in the art. Commonly, the rollers of the conveyor are each driven through a sprocket fixed to its shaft. The sprockets are typically driven by a common endless chain. The service conditions in which the sprockets operate are adverse, often with no practical way for sealing the materials being processed away from the sprockets and for lubricating the sprockets. The operating conditions typically result in a wear rate that requires replacement of the sprockets every year or so and, in any event, far more routinely than an entire conveyor is replaced.

Sprocket replacement is expensive in terms of both the cost of parts and labor. The sprockets typically occupy a crowded space and it is not easy to separate them from their respective shafts after they have been in service for any significant period. It is common for a mechanic to break the sprockets off, by striking blows with a hammer, rather than pulling them off, since it is difficult to grip them with a puller and it is not unusual for them to be tightly locked onto their shafts as a result of corrosion and the build-up of dirt and debris on the shafts.

SUMMARY OF THE INVENTION

The invention provides a novel sprocket arrangement for a powered roller conveyor useful in a hot air dryer or like processing equipment. The sprocket arrangement of the invention comprises mating hub and sprocket plate elements that allow ready replacement of the sprocket plate after its service life has been exhausted while allowing the hub to remain fixed on its associated roller shaft. The invention departs from the time honored practice of replacing worn out integrated sprocket and hub units. By only replacing that part of a sprocket and hub drive unit that experiences significant, and in practice, inevitable wear, the invention affords substantial savings in both material and labor.

Since only about half of the combined material of the sprocket and hub assembly is replaced, there can be significant savings in material costs. Moreover, the labor to replace a worn sprocket plate, in accordance with the invention, is considerably less than that involved in removing a prior art unitary sprocket and hub, typically frozen on to the roller shaft and difficult to reach because of obstructions posed by adjacent sprockets and other parts of the conveyor.

The disclosed sprocket plate and hub elements have unique mating configurations that allow the sprocket plate to apply torque to the hub through abutting surfaces that are generous in size and effective radius so as to transfer forces by low compressive stresses rather than at concentrated points by shear forces. In one embodiment, the torque coupling between the sprocket plate and hub is isolated from machine screws used to hold these components together. Consequently, these fastener elements or screws can be of moderate size, thereby saving costs and effort needed for their original assembly and eventual removal when a sprocket must be replaced. In another embodiment, the sprocket and hub are configured to be coupled together without separate fasteners.

The disclosed sprocket plate and hub arrangement solves a problem of removing a sprocket from an operational position where the hub has a maximum outside diameter larger than a minimum inside diameter of the sprocket plate.

Still further, in one disclosed preferred embodiment, the sprocket plate is configured as a ring with a large open center to permit it to be removed, when worn out, by slipping it over its associated roller thereby affording flexibility in the steps that can be taken for sprocket plate replacement. This flexibility in the manner in which the sprocket plate can be removed allows a mechanic to choose the easiest way, off either end of a roll assembly for its removal, while still avoiding the removal of the sprocket hub. The ring-like structure of a sprocket plate significantly reduces its material content over that compared with integrated sprocket and hub units thereby reducing the cost of manufacture of replacement parts.

BRIEF DESCRIPTION OF THE DRAWINGS

FIG. 1 is a simplified fragmentary elevational view of a roller conveyor fitted with one embodiment of the sprocket arrangement of the invention;

FIG. 1A is an elevational end view of the relationship of a sprocket plate to its associated roller in the arrangement of FIG. 1;

FIG. 2 is a fragmentary plan view of the conveyor arrangement of FIG. 1;

FIG. 4 is a side elevational view of a sprocket plate in accordance with a second embodiment of the invention;

FIG. 5 is a cross-sectional view of a "half" sprocket plate taken in the plane 5-5 indicated in FIG. 4;

FIG. 6 is a cross-sectional view of a "full" sprocket plate taken in the plane 6-6 indicated in FIG. 4;

FIG. 7 is a side elevational view of a hub in accordance with the second embodiment of the invention;

FIG. 8 is an edge view of the hub of FIG. 7;

DESCRIPTION OF THE PREFERRED EMBODIMENTS

Figure 3:
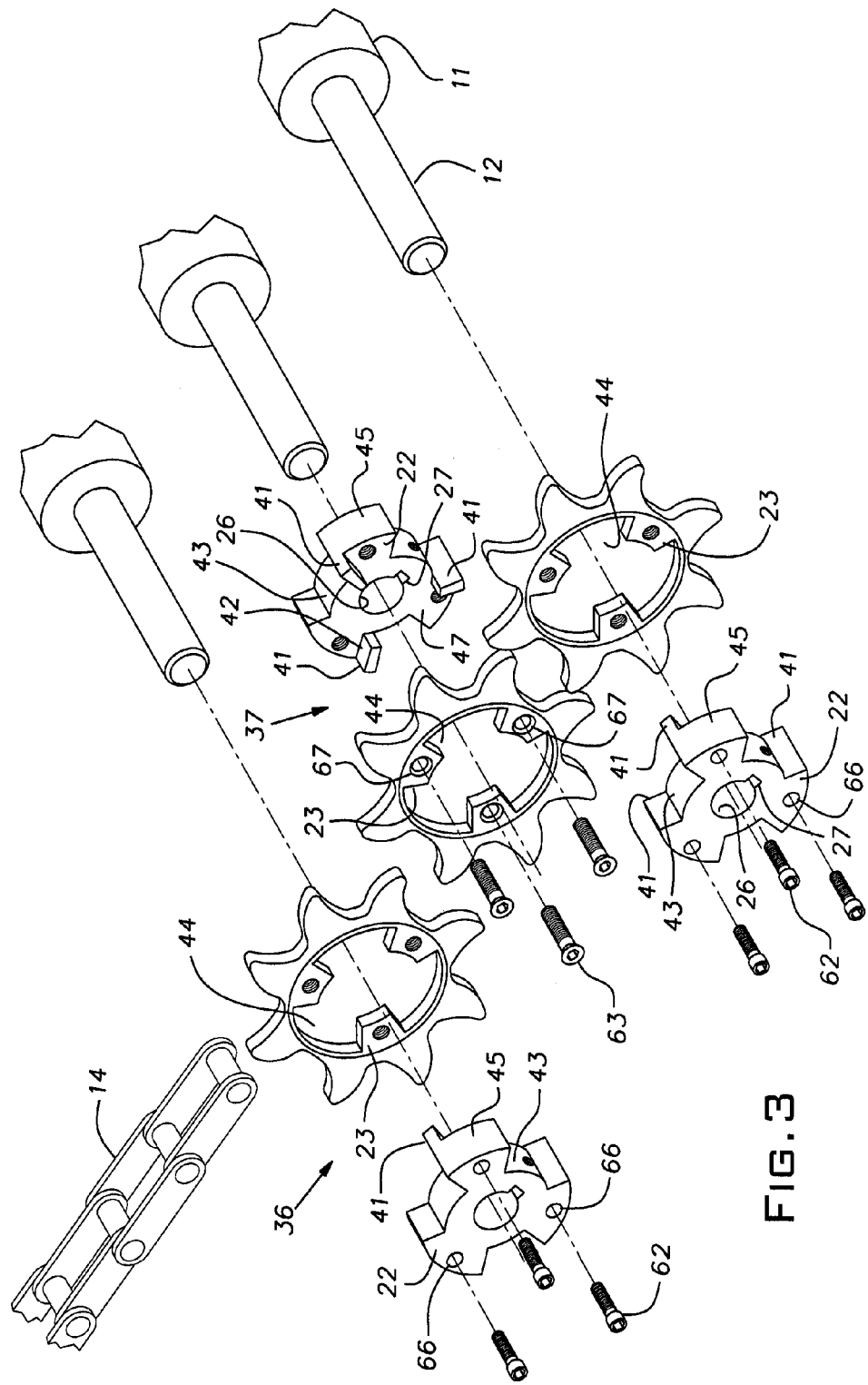
FIG. 3 is a fragmentary exploded perspective view of the conveyor of FIG. 1.
Figure 9:
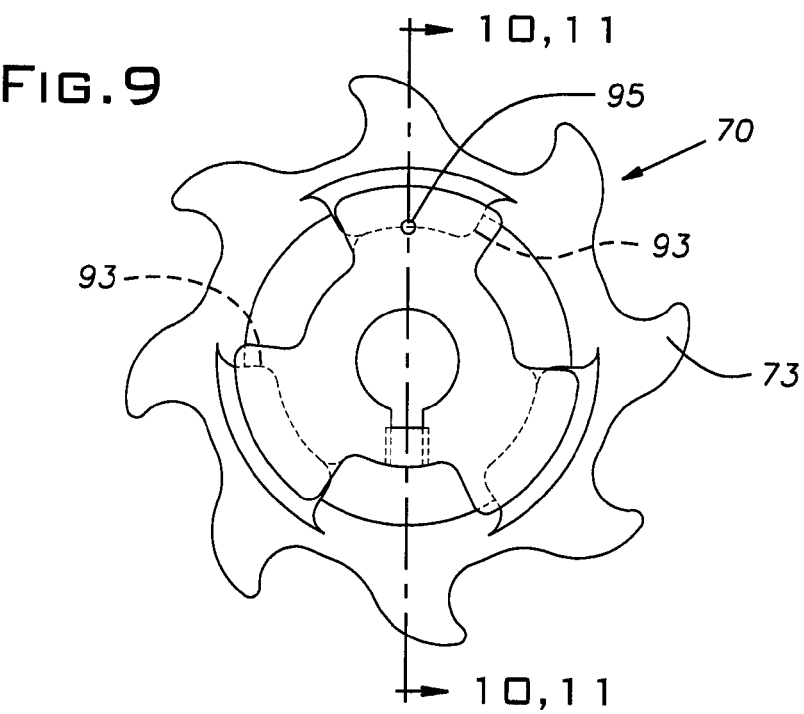
FIG. 9 is a side view of a sprocket and hub assembly in accordance with the second embodiment of the invention.

Referring to the figures, there is shown a partial area of a roller conveyor 10 of the type used, for example, in dryers employed in the manufacture of drywall, particle, flake or chipboard, ceiling tile, and like products that are formed by drying a slurry or wet intermediate product. The conveyor 10 has cylindrical rollers 11 carried on respective concentric round shafts 12 mounted in bearings 13 as is conventional. Normally, a large number of rollers 11 are used in a conveyor but for simplicity only three are shown in the figures. It will be understood that a bearing 13 is provided at each end of each roller 11. The rollers 11 are arranged parallel to one another in a common horizontal plane, typically, with a uniform center-to-center spacing. The rollers 11 can be mounted close to one another to adequately support the material being conveyed which is often in a weak state incapable of supporting itself across a significant span.

Ordinarily, in a typical dryer, there are several vertically spaced layers or decks of rollers 11. The rollers 11 of each level or deck are all driven in the same direction of rotation by a common chain 14, which may be of the conventional roller type. Customarily, the chain 14 contacts only one or a limited number of teeth 16 of a sprocket 17 associated with a respective roller 11 at any given time. Usually, the rollers 11 of a level or deck are driven by a single chain at one side of the conveyor 10.

The sprockets 17, in accordance with the invention, are assemblies of a sprocket plate 18 on which are formed the teeth 16, and a hub 19 that is mounted on a roller shaft 12. As will be described, the sprocket plate 18 and hub 19 are specially configured to interfit or mate with one another for a positive rotational drive between these elements and, alternatively, for passage of the sprocket plate axially completely over the hub. More particularly, the sprocket plate 18 has a spider-like internal bore 21 while the hub has a complementary external spider profile, characterized by radially extending legs or spokes 22 that can fit through the bore.

Each hub 19 is preferably a metal body with a plurality of three internally radially extending legs or spokes 22. The hubs 19 can be formed of any suitable material such as a ferrous metal like cast iron, cast steel, or hot roll steel. A bore 26 of the hub 19 is sized to fit the shaft 12 of a respective roller 11 which shaft typically is 1-¼ inch in diameter.

The sprocket bore 26 includes an internal keyway 27 for receiving a key 28. The key 28 is also received in an external keyway in the shaft 12 as is conventional. A set screw 29 threaded into a radial hole 31 in the hub 19 locks against the key 28 and releasably fixes the hub 19 onto the shaft 12.

The sprocket assemblies 17 along the conveying direction alternate between two constructions or styles, one 36 lying outside, with reference to a zone occupied by the rollers 11, of an imaginary vertical plane passing through the middle width of the chain 14, and the other 37 lying to the inside of this imaginary plane. In other words, the inside and outside designations of these sprocket assembly styles 36, 37 is made with the understanding that parts on the side of the imaginary vertical mid-plane of the chain adjacent the rollers 11 are "inside" and parts on the other side of this imaginary plane are "outside". To the extent that the features of the sprocket plates and hubs are the same or similar in shape or function, the same reference numerals will apply. The sprocket plates of both styles 36, 37 have essentially the same axial profile, including number of teeth and outside diameter.

The sprocket assemblies 17, as mentioned, are all driven in the same rotational direction so that their respective rollers 11 also revolve in this same direction. Adjacent leading edges of the hub legs or spokes 22, with reference to their direction of rotation, are radially extending lugs or stops 41. The lugs 41 are formed with abutment surfaces 42 that facing rearwardly with reference to their rotational direction, preferably lie in radial planes that are parallel to and pass through the center of rotation or axis of the hub 19. The abutment surfaces 42 extend radially outward from an imaginary cylinder concentric with the hub axis and coincident with cylindrical surface segments 43 at the base or radially inward ends of the legs 22. The abutment surfaces 42 terminate radially outwardly at cylindrical outer surface segments 45 of the legs 22 on a common imaginary cylinder concentric with the bore 26 and forming the major outside hub diameter.

The sprocket plates 18 have asymmetric unidirectional teeth 16 that are shaped to provide a positive drive from limited tangential engagement of the chain 14. Tips 56 of the teeth 16 represent the outside maximum diameter of the sprockets 17. The sprocket plates 18 have central bores 57. Arcuate surface areas 58 of the bore 57, represent a major diameter area and three intervening arcuate surface areas 59 represent the minor diameter of the bore 57. The internal sprocket legs 23 are equally angularly spaced and form the minor diameter areas 59 at their inner ends. As seen, the legs 23 span the arcuate space between the major diameter arcuate surfaces 58. Leading abutment faces 61, with reference to the direction of rotation of the sprocket assemblies 17, extend between the inside diameter and outside diameter bore surfaces 58, 59 and preferably lie in flat planes that are radial to, pass through, and are parallel to a central axis of the sprocket plate 18.

In the illustrated embodiment, the hub legs 22 of either sprocket style 36 or 37, are three in number and the sprocket plate legs 23 are of the same number. The arcuate extent of each hub leg 22 is slightly less than an arcuate gap 44 between the internal legs or spokes 23 of the internal sprocket plate bore 21. This arcuate geometry of the hub and sprocket plate legs as well as the limited radial extent of these legs results in an outer hub profile that is complimentary to and slightly smaller than the interior bore 57 of the sprocket plate thereby enabling a sprocket plate to pass completely over a hub.

A face 47 of the hub 19 lies in a flat radial plane transverse to the hub axis and serves as a seat or abutment surface against which the sprocket plate 18 is secured by machine screws 62, 63. The sprocket plates 18 are removably assembled on corresponding hubs with the axes of these elements coincident and held in place by a set of the machine screws 62 or 63. In the case of the outside style of sprocket assembly 36, the sprocket plate 18 is held to the hub 19 with socket head machine screws 62 threaded into the sprocket plate and in the case of the inside style of sprocket 37 the sprocket plate 18 is held to the hub 19 by flat head machine screws 63 threaded into the hub. The screws 62, 63, hold the respective sprocket plates 18 in abutting contact with the radial hub face 47. It is this surface 47 from which the hub lugs 41 axially project. When mounted on a hub 19, radial sprocket surfaces 61 abut the radial lug or abutment surfaces 42 enabling the torque developing forces imposed by the chain 14 to be transmitted to the hub with low compressive stresses imposed on these surfaces as a result of being relatively large and being disposed radially outwardly significantly from their rotational axis. Non-threaded clearance holes 66, 67, that receive the machine screws 62, 63 in the hubs of the respective outside sprocket styles 36 or in the sprocket plates of the inside sprocket style 37, ensure that the torque transmitted from the sprocket plate 18 to the hub 19 is isolated from the screws, it being understood that this torque is developed by the abutment surfaces 61, 42.

As seen in FIG. 2, and as discussed, the inside and outside styles 37, 36 of the sprocket assembly 17 can alternate along the feed direction of the conveyor 10 to permit a relatively large sprocket diameter to be used in proportion to the center-to-center distance of the shafts 12. By offsetting the sprocket assemblies 17 to either side of a center plane of the chain 14, the sprocket plate 18 of one assembly does not interfere with the sprocket 18 or hub 19 of an adjacent sprocket assembly even where, as shown, the center-to-center distance of adjacent shafts 12 is less than the combined radius of a sprocket and a radius of essentially any part of the sprocket hub on the adjacent shaft. This geometry thereby allows relatively large sprockets to be used and, in turn, reduces the forces required of the chain on the sprocket teeth to develop a given level of torque.

At least the sprocket plates 18 on the outer sprocket assemblies 36, and preferably the sprocket plates on the inner sprocket assemblies 37, are able to be passed completely over their associated hubs 19 for purposes of removal and replacement.

The sprocket plates 18 can experience relatively high wear rates due to their operating environment and from time-to-time may need to be replaced. Both the inside and outside sprocket plates can be changed without removal of their associated hubs. Moreover, removal and replacement of these plates can be readily accomplished because the machine screws 62, 63 securing these plates on their respective hubs can be conveniently reached from the outside, i.e. the space outward of the chain 14, with the convention that the conveyor rollers 11 are to the inside.

With the invention, replacing each of the sprocket plates 18 is a simple matter of removing three screws 62 or 63, and separating the plate from its hub. The need for breaking the hub loose from its fit on a shaft 12 is eliminated. Prior to assembly, the screws 62, 63, can be coated with a suitable protective sealant so that the risk of corrosion in the threaded holes in the sprocket plate 18, or hub 19 is reduced. The torque between the sprocket plate and hub developed by the chain force is transmitted between the radial abutment faces 42 and 61 and is preferably isolated from the screws by appropriately dimensioning the parts and especially as mentioned, the clearance holes. Typically, where desired, the shaft 12 can be lifted slightly for access to any of the machine screws 63 on the inside sprocket plates. FIG. 4 shows that a sprocket plate 18 can be removed by sliding it axially over the respective roller 11. This optional method of removal is permitted where, as shown, the minor inside diameter of the sprocket plate is slightly larger than the diameter of the roller. This geometry can be used on the inside sprocket assembly 37 enabling the inside sprocket to be removed, for example, while the adjacent outside sprockets remain in place or can be used on both inside and outside sprocket assemblies for greater flexibility in maintenance or replace operations.

In many instances, the rollers 11 can be spaced apart far enough to allow the sprockets of each roller to be in-line, i.e. in a common plane without interference. In this case, the width or thickness of a sprocket plate can be double that shown in the figures, while still using the illustrated chain and the axial sprocket plate profile can be the same as that of the described and shown sprocket plates. Such a wide or full width sprocket plate is conveniently used with the inside sprocket style hub illustrated in FIG. 2.

FIGS. 4-11 illustrate a second embodiment of a sprocket assembly 70 that has structure and function analogous to that of the assembly 17 described in connection with FIGS. 1-3. The sprocket assembly 70 comprises a sprocket plate 71 and a hub 72 each of which is made from a suitable material such as steel or other ferrous metal. The sprocket plate 71 and hub 72 can be cast, stamped, forged, machined or otherwise made into their respective shapes as desired. The sprocket plate 71 has peripheral unidirectional teeth 73, distributed about its geometric center, to cooperate with the roller chain 14 like that shown in FIGS. 1 and 3. The hub 72 has a keyed cylindrical bore 74 with an associated set screw 76 for locking a key 77 onto a shaft such as the shaft 12 shown in FIGS. 1 and 3. When assembled on the hub 72, the ring-like sprocket plate 71 has its teeth 73 concentrically disposed about the axis of the bore 74.

Figure 10:
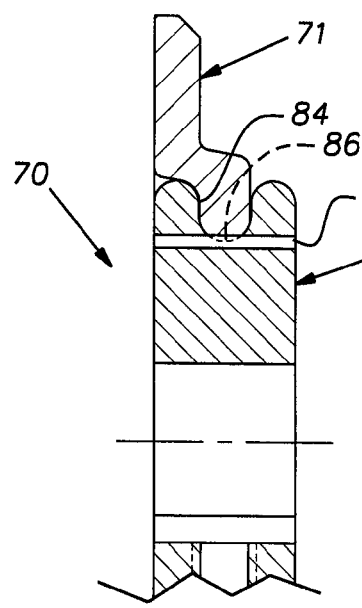
FIG. 10 is a fragmentary view, on an enlarged scale, of the sprocket and hub assembly where the sprocket plate is the "half" style of FIG. 5.
Figure 11:
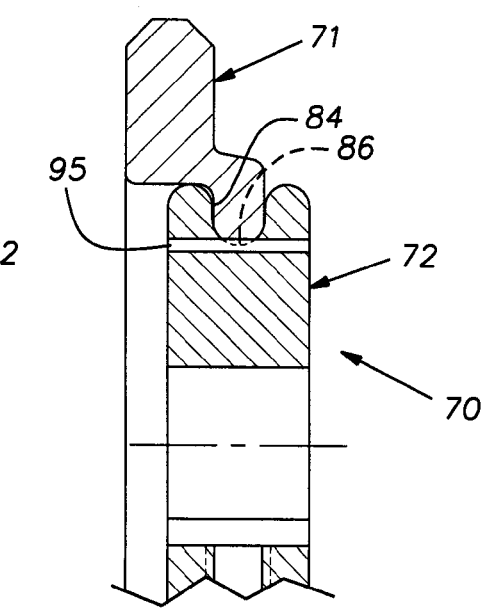
FIG. 11 is a fragmentary view like FIG. 10, showing the "full" style sprocket plate of FIG. 6.

The hub 72 has a central core 78 with a generally circular exterior surface 79 concentric with the bore 74 and with a plurality of three equally angularly spaced legs 81 extending radially outwardly from this core surface 79. The legs 81 have radially outer surfaces 82 lying on a common imaginary cylinder concentric with the bore 74. Between the legs 81 are arcuate spaces 83. As shown in FIGS. 8, 10 and 11, the legs 81 each have a slot 84 at mid-length in the axial direction of the bore 74. Each hub leg slot 84 is open at one arcuate side of the leg 81 and adjacent the cylindrical surface 82. Each slot 84 has a bottom 86 concentric with the bore 74 on a radius equal or larger than the radius of the core 78. In an angular direction with respect to the axis of the bore 74 the slot 84 ends to form a generally radially oriented abutment surface 87 that can be semi-cylindrical or otherwise somewhat rounded, when viewed in a plane transverse to the radial direction, for ease of manufacture.

The sprocket plate 71 is ring-like in form and has a plurality of three radially inwardly extending equally angularly spaced legs 89. The legs have inner surfaces 91 on a common imaginary cylinder concentric with the geometric center of the body of the sprocket plate 71. Arcuate spaces or gaps 92 between each sprocket plate leg are larger in profile than the profile of a hub leg 81. The sprocket plate legs 89 have leading edges 93 in a rotational sense that are generally radial with respect to the center of the sprocket plate 71. As indicated in FIG. 5, showing a sprocket of "half" thickness, the legs 89 lie in a plane that is offset from the plane of the peripheral teeth 73 a distance that preferably is at least equal to the thickness of the sprocket in the base area of the teeth. The spaces 92 are radially bounded by surfaces 94 lying on a common imaginary cylindrical surface concentric with the center of the sprocket plate 71. The surfaces 94 form the major inside diameter or bore of the sprocket plate while the surfaces 91 form the minor inside diameter of the sprocket.

As the case with the sprocket and hub shown in FIGS. 1-3, the major and minor inside diameters of the sprocket plate 71 are at least as large as the major and minor outside diameters of the hub 72. This relationship, in addition to the gaps between the sprocket legs 89 being larger than the arcuate widths of the hub legs 81 enables the sprocket plate 71 to pass completely over the hub 72.

The sprocket plate 71 is assembled on the hub 72 by angularly aligning its legs 89 with the hub spaces 83 and slipping it onto the hub until the plane of the legs 89 is coincident with the plane of the hub grooves or slots 84. The sprocket plate 71 is then rotated relative to the hub 72 in a manner similar to a bayonet connection such that the sprocket plate becomes rotationally coupled to the hub with the radial edge abutment faces 93 on the sprocket legs 89 abutting respective end walls or abutment surfaces 87 at the arcuate ends of the hub slots 84. The sprocket plate 71 can be releasably locked in position on the hub 72 with a roll pin 95 received in holes drilled through the hub and sprocket plate parallel to their axis.

FIGS. 5 and 10 illustrate a "half" width sprocket that can be used as described earlier where the roller shaft centers are close and inside and outside half width sprockets are alternately mounted from shaft-to-shaft. The sprocket of FIG. 5 can be an outside sprocket and a complementary inside sprocket can be configured as a mirror image of it. A "full" sprocket useful when the conveyor roller spacing is large is illustrated in FIGS. 6 and 11. It is desirable to proportion the hub 72 widthwise in the manner shown such that its axial length is three times the nominal thickness of a half sprocket at the base of the teeth or 1-½ times the width of a full sprocket at the base of its teeth and it is symmetrical about a mid-plane perpendicular to the axis of the bore 74. This length permits the hub 72 to be used with both inside and outside style sprockets without interference with an adjacent sprocket as well as with full width sprockets.

It will be understood that sprocket plates of the style illustrated in FIG. 4 can be readily removed from a hub for replacement while the hub remains locked on a shaft. Removal of a sprocket plate 71 only requires the roll pin 95 to be knocked out and the sprocket plate to be rotated in a reverse direction relative to the hub until its legs 89 are aligned with the spaces 83 between the hub legs 81 and then moved axially off of the hub.

It should be evident that this disclosure is by way of example and that various changes may be made by adding, modifying or eliminating details without departing from the fair scope of the teaching contained in this disclosure. For example, in the embodiment of FIGS. 1-3, the sprocket plate can be retained against the hub by elements other than machine bolts such as a wedge or a horseshoe clip. The invention is therefore not limited to particular details of this disclosure except to the extent that the following claims are necessarily so limited.

What is claimed is:

1. A sprocket assembly for a roller conveyor comprising a hub and a sprocket plate, the hub having a central cylindrical bore for fitting onto a round shaft of a roller, the hub having provisions for rotationally and axially locking it on a shaft in a manner adequate to transmit torque to the shaft and rotationally drive the roller, the sprocket plate having peripheral teeth adapted to be interengaged with a drive chain and a central bore capable of receiving the shaft, the sprocket plate and hub being constructed and arranged to be removably joined together with the centers of their respective bores coincident, said hub and sprocket plate having complementarily shaped radially extending abutting surfaces enabling the sprocket plate to develop torque on the hub by compressive forces developed by the radially extending sprocket plate surfaces against the radially extending hub surfaces.

2. A sprocket assembly as set forth in claim 1, wherein the sprocket plate bore has a configuration enabling it to pass completely over the hub.

3. A sprocket assembly as set forth in claim 2, wherein the sprocket plate and hub parts are removably joined by machine screws, the screws being threaded into one of said parts and the other of said parts having clearance holes for receiving said screws, said holes and screws having axes parallel to the axes of said hub bore and said sprocket plate bore.

4. A sprocket and hub assembly for power driving a roller of a multi-roller conveyor in which the rollers are carried on shafts arranged on center-to-center distances less than a combined maximum radius of the sprocket and a radius on the hub, the sprocket plate being constructed and arranged to be removably fixed to the hub and to reliably transmit torque to the roller shaft through the hub, the hub having a central bore sized to fit the roller shaft, the sprocket plate having a bore configured to pass completely over the hub, whereby the sprocket plate can be removed when worn and replaced with a duplicate while the original hub remains in place on the shaft.

5. A sprocket and hub assembly as set forth in claim 4, wherein the sprocket plate is constructed and arranged to be fixed on an inner end face of the hub facing towards the respective roller.

6. A sprocket and hub assembly as set forth in claim 5, wherein the sprocket plate and hub are fixed together with screws assembled in the sprocket plate and hub in a direction from an outer end of the hub toward an inner end.

7. A powered roller conveyor comprising a plurality of parallel horizontally disposed rollers uniformly spaced in close proximity to one another, the rollers being supported on shafts which, in turn, are supported in bearings, a sprocket assembly mounted on each of the roller shafts, the sprocket assemblies each comprising a sprocket plate and hub of predetermined diameters, each of the sprocket plates having peripheral teeth forming the major outside diameter of the sprocket plates and being engaged by a common drive chain, alternate sprocket assemblies being disposed substantially exclusively outside of a vertical mid-plane of the chain and intervening sprocket assemblies being disposed substantially exclusively on the inside of the vertical mid-plane of the chain, said sprocket plates being capable of being de-mounted from their respective hubs while the hubs remain on their respective shafts from operations conducted substantially and completely by access from the space outward of said mid-plane.

8. A powered roller conveyor as set forth in claim 7, wherein the center-to-center distances between the rollers is less than the combined radius of said sprockets and a radius of the hubs.

9. A powered roller conveyor as set forth in claim 8, wherein sprocket plates of said intervening sprocket assemblies have an inside bore configured sufficiently large to pass over said cylindrical rollers.

10. A generally circular sprocket plate for a powered roller conveyor concentric about a rotational axis, the sprocket plate having unidirectional outer peripheral teeth arranged to be engaged by a drive chain, and a central bore having a minor inside diameter and a major inside diameter, three legs spaced angularly uniformly about the rotational axis, the legs each extending radially between the minor and major inside diameter, the legs each having a radially extending generally flat face lying in a plane generally parallel to and passing through the rotational axis, said flat faces being adapted to abut complimentarily configured flat faces on a hub to rotationally drive said hub, said legs each having a circular hole for receiving a machine screw oriented in a direction parallel to the rotational axis and used to releasably fix the sprocket plate to the hub.

11. A sprocket assembly comprising a sprocket plate and a hub, the hub having an axial length, the sprocket plate being mounted on the hub such that the hub substantially avoids encroachment into any space to one side of the sprocket plate, the sprocket plate being de-mountable from the hub while the hub remains fixed on a shaft, the sprocket plate and hub having a plurality of interengaged abutting surfaces extending in generally radial directions adjacent a periphery of the hub and distributed about a common axis.

12. A sprocket plate for a powered roller conveyor comprising a ring-like body concentric about an axis, the sprocket plate having a series of unidirectional teeth on its periphery for receiving and being driven by a chain, a non-circular bore having minor and major inside dimensions, a set of three legs evenly angularly spaced about the body extending generally radially between the minor and major dimensions, the legs each having an abutment surface lying along a plane that passes through and is parallel to said axis, said abutment surfaces facing in a forward direction with reference to the direction of rotation developed by said chain and adapted to drive a hub with abutment surfaces arranged to be engaged by said sprocket plate abutment surfaces.

13. A sprocket plate as set forth in claim 12, wherein said legs are disposed in a plane axially offset from a plane in which said sprocket teeth are disposed, the offset distance being substantially equal to or one and one-half the width of a base of said teeth.

14. A sprocket plate as set forth in claim 12, wherein said legs have axially oriented holes adapted to receive bolts for fixing said sprocket plate to said hub.

15. An easy change sprocket plate for use in a roller conveyor in which a plurality of adjacent rollers are individually driven through a common chain and a respective sprocket, the sprocket plate having a generally ring-like structure disposed about a geometric center with unidirectional chain engageable teeth on its outer periphery and a plurality of angularly equally spaced radially inwardly extending legs, the legs each having a generally radially extending abutment surface facing in the direction that the unidirectional teeth are arranged to be driven, the abutment surfaces being adapted to engage and apply torque to a complementarily shaped hub fixed to the respective shaft of the respective roller, the sprocket having angularly spaced openings between said legs, said openings extending radially from the sprocket center at least as far as the radial extent of said radially extending surfaces whereby said sprocket is adapted to pass over the hub for installation on and removal from the hub.

\* \* \* \* \*